May 16, 1933.  H. A. STRUEBING  1,909,909
GOVERNOR FOR CORN BINDERS
Filed Jan. 21, 1932   2 Sheets-Sheet 1
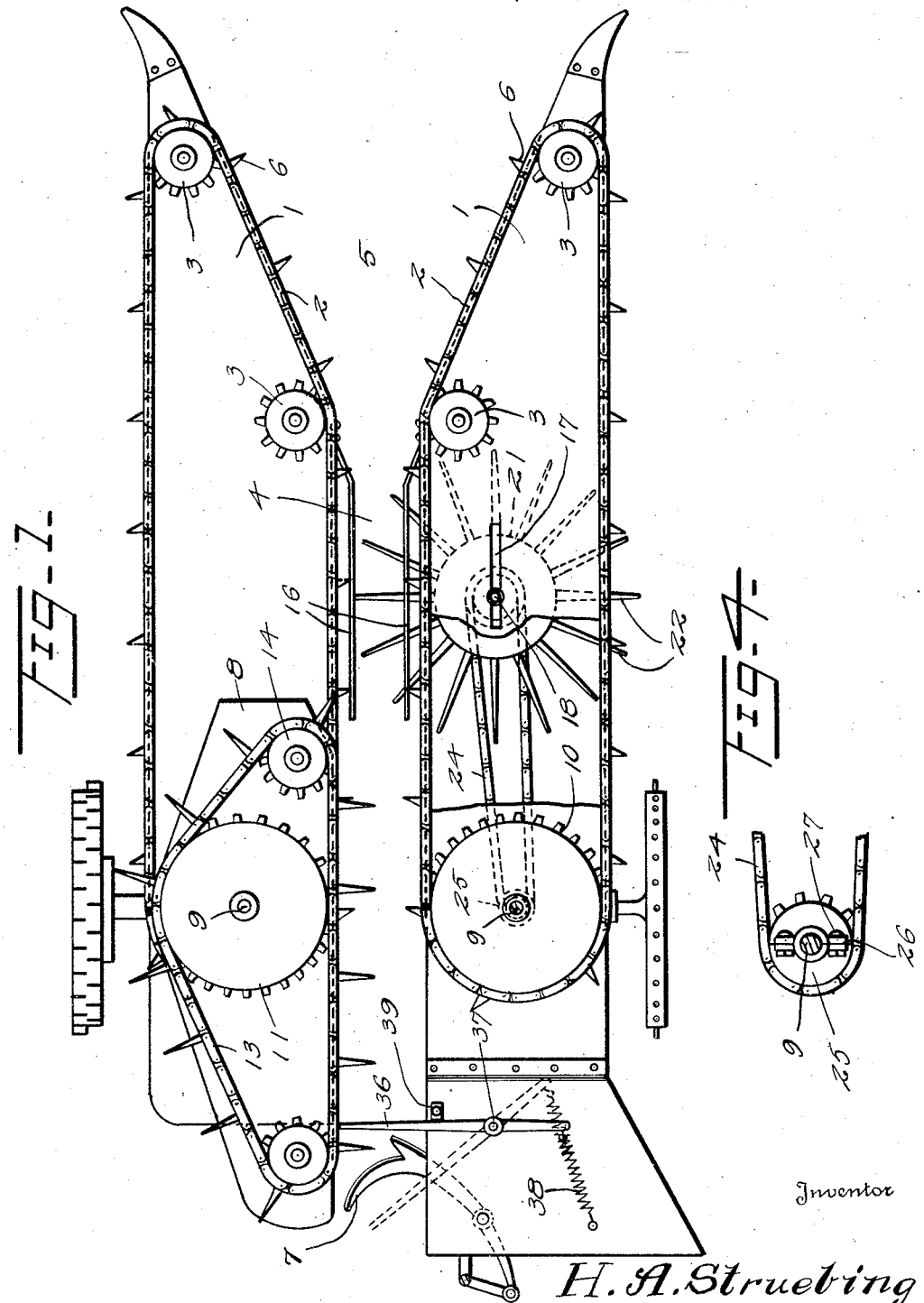
Inventor
H. A. Struebing
By Watson E. Coleman

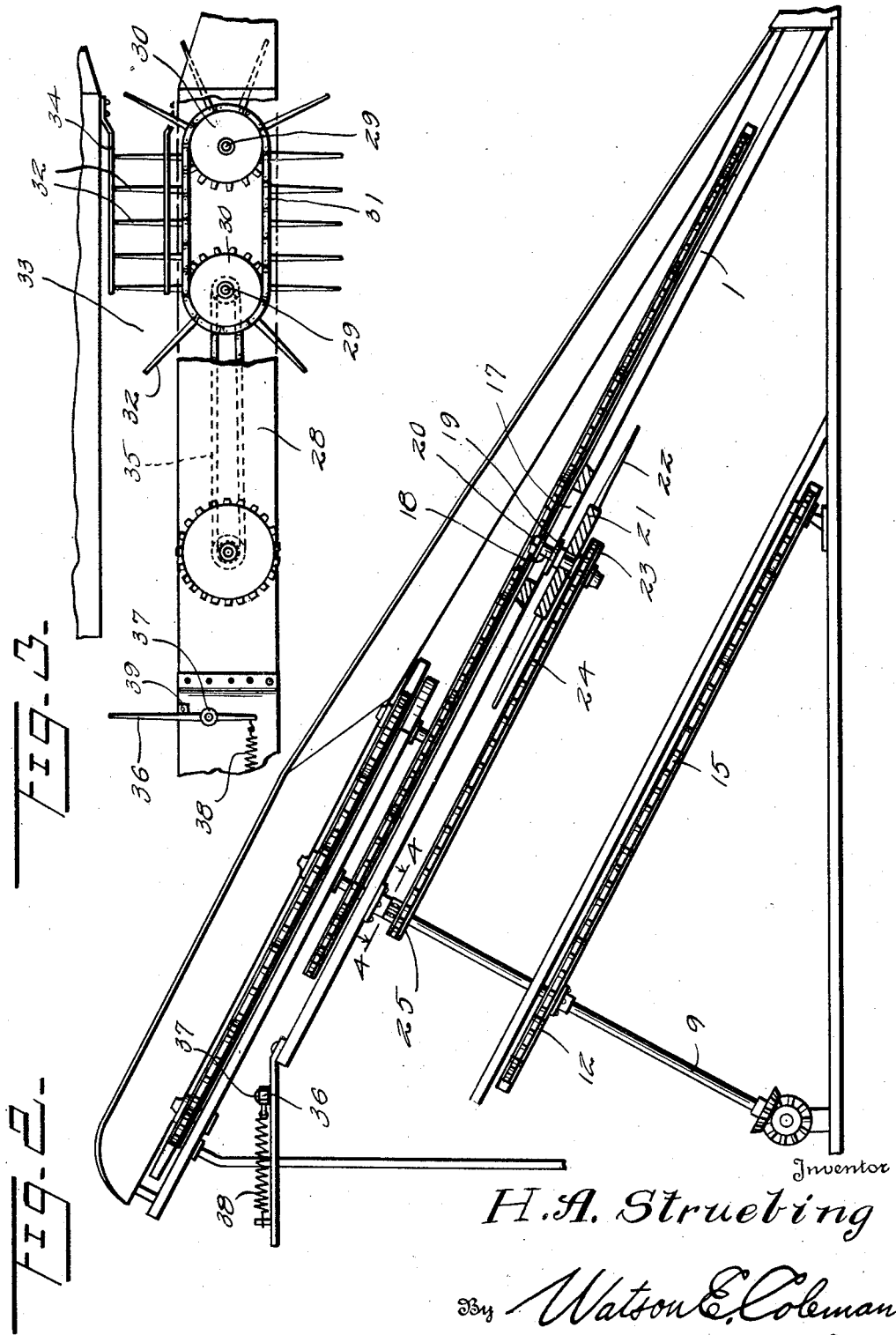

Patented May 16, 1933

1,909,909

UNITED STATES PATENT OFFICE

HERMAN A. STRUEBING, OF WINFIELD, KANSAS

GOVERNOR FOR CORN BINDERS

Application filed January 21, 1932. Serial No. 587,975.

This invention relates to attachments for corn binders and pertains particularly to a governor for adjusting the corn stalks to the most advantageous position for bundling and binding.

The primary object of the present invention is to provide a means whereby the corn stalk after being cut and as it is being conveyed to the binder, will be shifted so that the butt end thereof will move toward the binder slightly in advance of the type thus causing the stalks to collect upon the binder platform in vertical position so that they may be easily packed and bound in a neat bundle.

A further object of the invention is to provide means whereby the cut stalks after being gathered together preparatory to passing onto the binder platform, will be securely held so that none may fall back into the conveyor structure by which they are moved to the binder platform and thus clog the same.

A still further object of the invention is to provide a governor structure for performing the above described operation, which may be readily mounted upon the stalk conveyor of the corn harvester without altering the position or changing the construction of any of the parts thereof.

Other objects and advantages of the invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 illustrates more or less conventionally a stalk conveyor forming a part of a corn harvester, showing the preferred form of the present invention in association therewith;

Figure 2 is a view in side elevation of the structure shown in Figure 1, the supporting traction wheels being removed and parts of the structure embodying the present invention being shown in section;

Figure 3 is a view in top plan of a modified form of the present invention showing the position assumed by the same with relation to adjacent parts of the conveyor apparatus;

Figure 4 is a detailed sectional view taken upon the line 4—4 of Figure 2.

Referring now more particularly to the drawings wherein like numerals of reference indicate corresponding parts throughout the several views, the numeral 1 indicates the supporting platforms of the conveyor mechanism of a corn harvester and binder structure for the upper forward pair of endless chain conveyors 2 which as shown and as is well known by those skilled in the art, are arranged to pass over supporting sprocket wheels 3 so as to run through a portion of their length in parallel relation to form a throat 4 through which the upright corn stalks pass after being cut and entering the same through the mouth 5. These conveyor chains carry prongs or teeth 6 which make positive the movement of the stalks through the throat to the rear end of the structure where they are picked up by the usual binder machine elements 7 to be held in the proper bundled relation while the binder machine is performing its operation thereon. At the rear portion of the conveyor mechanism are upper rear platforms, one only of which has been illustrated and this is indicated by the numeral 8. The other upper platform is normally disposed over the rear portion of the machine at the opposite side of the platform shown but has been removed for the sake of clearness. Power shafts 9 extend vertically through the two sides of the machine and carry upper driving sprocket wheels 10 and 11 and lower driving sprocket wheels 12, the upper sprocket wheel 11 of each shaft 9 engaging an endless conveyor chain 13 which passes about suitable supporting sprocket wheels 14 and which overlies the upper platforms 8.

The sprocket wheel 10 upon the upper end of each shaft 9 has one of the endless chains 2 trained thereabout and transmits power to the same. Lower endless chains 15 are mounted upon opposite sides of the throat 4 and these engage the butt portions of the corn stalks while the upper chains engage the tops thereof.

In carrying out the present invention the opposed edges of the platforms 1 have attached thereto at the forward end of the throat 4 the ends of the elongated spring arms 16, the rear ends of these arms being free as shown. These spring arms 16 stand away from the adjacent edges of the platforms throughout the major portion of their length and a distance slightly greater than the extent of projection of the prongs or teeth therefrom so that the upper portions of the corn stalks on entering the throat and after being cut by the sickle or knife, will be removed from the influence of the teeth of the conveyor chains 2 and will thus be subject to the control of the mechanism forming the present invention.

At one side of the machine the upper platform 1 is provided with a longitudinally extending slot 17 through which is extended from the under side of the platform one end of a hanging shaft 18. This shaft has a collar thereabout as indicated at 19 which bears against the under side of the platform 1 and its upper end is engaged by a nut 20 which secures it in position upon the platform in the manner illustrated in Figure 2.

Splined or keyed to the depending shaft 18 beneath the board 1 is a governor wheel 21 from the periphery of which projects a plurality of relatively long arms each of which is indicated by the numeral 22 and which will hereinafter be referred to as governor arms. These arms, preferably sixteen in number are of sufficient length to extend across the opening of the throat between the resilient arms 16 as illustrated in Figure 1, as they are swung around to the proper position during the rotation of the wheel. Beneath the governor wheel 21 is secured a sprocket wheel 23 about which is passed a sprocket chain 24 which connects this sprocket wheel 23 with a sprocket wheel 25 mounted upon the adjacent power shaft 9. The sprocket wheel 25 is preferably of about one-third a circumference of the sprocket wheel 23 so that the latter wheel will turn at one-third the speed of the power shaft 9 to which it is connected.

In order that the device may be mounted upon the conveyor mechanism with the least amount of changes in the latter, the sprocket wheel 25 is preferably formed in halves as indicated in Figure 4 and each half carries a pair of ears each of which is indicated by the numeral 26, which are bolted together as shown in Figure 4 by bolts 27. By this means, after the governor wheel 21 has been mounted in position upon the platform 7, it may be operatively coupled with the mechanism of the conveyor without making any alterations in the latter.

In Figure 3 there is shown a slightly modified form of my invention as illustrated in Figures 1 and 2.

In this form of the invention one upper platform of the machine, which is indicated generally by the numeral 28 has mounted thereon to extend downwardly therefrom a pair of shafts 29 on which are mounted sprocket wheels 30 which are connected by the endless chain 31. This endless chain is provided with a plurality of arms 32 which in the course of their movement with the endless chain 31 project across and move longitudinally through a portion of the length of the throat 33 of the machine. The path of movement of these arms 32 in the throat 33 is flanked by the spaced parallel spring arms 34 of the same character as the arms 16 of the preferred construction.

A two part sprocket wheel similar to the sprocket wheel 25 is mounted upon the power shaft for the operation of the modified form of the invention and this is connected with one of the shafts 29 by a suitable sprocket chain 35.

In association with each form of the invention there is employed a guard lever 36 which has one end positioned transversely of the throat of the machine at the rear thereof as is clearly illustrated in Figures 1 and 3. This guard lever is pivotally mounted adjacent its inner end as indicated at 37, upon a suitable portion of the machine and a spring element 38 is connected with the other or inner end and normally maintains the same against a suitable stop 39 in which position the forward end of the lever extends across the throat of the machine in the manner illustrated.

In the operation of the present governor as the conveyor portion of the machine moves forward the corn stalks will enter the mouth portion 5 after being cut and will then pass into the throat 4 under the influence of the teeth 6 of the endless chains. As the throat is entered the upper portions of the stalks will move against the resilient spring arm 16 and thus be forced inwardly toward the center of the throat and out of engagement with the teeth 6 of the upper conveyor chains. The lower conveyor chains 15 will continue to engage the butt ends of the stalks and carry them along in the throat. At this period in the operation of the machine the arms 22 of the single governor wheel or the arms 32 of the endless chain type of the governor will take control of the upper ends of the stalks and move them along in the throat but they will move the stalks at a slower speed than the lower chains and, therefore, the butt ends of the stalks will be shifted to move a little in advance of the tops. After the stalks have passed the resilient arms 16 the upper chains will again take control and the stalks will be carried toward the binder mechanism with their butts slightly in advance of the tops. The lever 36 at the rear end of the machine throat causes the stalks to stack up in a bundle and prevents them from falling forward into the binder apparatus. This lever also prevents any stalks from dropping back into the throat of the machine after they have been taken through by the gathering arms of the binder mechanism.

As shown by the dotted line position of the lever 36 in Figure 1 the lever swings rearwardly and is returned to its normal position transversely of the machine throat by the spring 38.

While there has been illustrated two mechanical methods of controlling the cut stalks as they are carried into the binder so that they will stack up in proper vertical position and with the butt ends arranged so that a flat bottom bundle will be formed, there is still another means by which the stalks can be shifted at their lower ends so as to advance in slightly inclined position toward the binder and this is by altering slightly the relative sizes of the sprocket wheels carrying the upper and lower conveyor chains so that the lower conveyor chains will be speeded up slightly in advance of the upper chains or vice versa, the upper chains will be caused to travel at a slightly slower speed than the lower chains. It is to be understood, therefore, that the "means" referred to hereinafter in the claims for causing the upper ends of the corn stalks to move toward the binder behind the butt ends thereof, refers to this method of controlling the movement of the stalks as well as the use of the arms 22 and 32 moving along the throat of the machine, and the other parts associated therewith.

Referring again to the structure shown in Figure 3 it will be seen that the sprocket wheels 30 are of smaller diameter than the sprocket wheel which is mounted upon the main conveyor chain operating shaft 9, with which shaft the chain 35 connects one of the shafts 29, so that in operation the wheels 30 will convey the sprocket chain, with the plurality of arms 32 extending across the throat of the binder, at a much slower speed than the upper chain or main conveyor chain. While the differences in size between the sprocket wheels 30 and the large sprocket wheel upon the main operating shaft 9 has been illustrated as being slight for the purpose of preserving the clarity of the showing, in actual practice the main sprocket wheel on the shaft 9 will be approximately twelve inches in diameter, while the sprocket wheels 30 which carry the chain 31 will be about four or five inches in diameter.

Having thus described the invention, what is claimed is:—

1. In an apparatus for conveying cut standing corn to a binder including upper and lower conveyor chains, means for shifting the vertical position of the corn stalks whereby the same will be carried uprightly to the binder with the butt ends thereof moving slightly in advance of the tops.

2. In an apparatus for conveying cut standing corn to a binder including upper and lower conveyor chains, means for removing the upper portion of the corn stalk from engagement with the upper conveyor chains through a portion of the travel of the latter, and means moving in the same general direction as the conveyor chains but at a slower speed than the same for engaging the upper portions of the corn stalks to permit the lower conveyor chains to move the butt ends of the stalks toward the binder in advance of the tops.

3. In a conveyor apparatus for moving cut standing corn into a binder, including superposed pairs of spaced conveyor chains forming a throat along which the corn is moved by the chains, means at one end of said throat for removing the corn stalks from the influence of the upper pair of conveyor chains, and arm members mounted upon the apparatus to enter the throat adjacent said means and to move along a portion of the throat at a slower speed than the adjacent upper chains to retard the movement of the upper ends of the corn stalks toward the binder.

4. In a conveyor apparatus for moving cut standing corn into a binder, including superposed pairs of spaced conveyor chains forming a throat along which the corn is moved by the chains, means at one end of said throat for removing the corn stalks from the influence of the upper pair of conveyor chains, arm members mounted upon the apparatus to enter the throat adjacent said means and to move along a portion of the throat at a slower speed than the adjacent upper chains to retard the movement of the upper ends of the corn stalks toward the binder, and a shiftable level element disposed transversely of the rear end of said throat and operating to prevent the falling of the corn stalks into the throat before the same reach the binder.

5. In an apparatus for moving cut standing corn to a binder and including spaced parallel upper and lower platforms forming a throatway and upper and lower conveyor chains overlying said platforms on either side of the throatway, a wheel mounted upon one of said upper platforms for rotation about a vertical axis, arm members carried by said wheel for extension across said throat and movement for a short distance longitudinally thereof, means for rotating said wheel at a speed to move the arms at a slower speed than the adjacent upper chains, and means in said throat and extending longitudinally through a portion thereof along the path of movement of the arms therein for removing the upper portions of corn stalks from engagement with the chains.

6. In an apparatus for moving cut standing corn to a binder and including spaced parallel upper and lower platforms forming a throatway and upper and lower conveyor chains overlying said platforms on either side of the throatway, a shaft mounted at one end in one of said upper platforms to depend therebeneath and to rotate about a substantially vertical axis, a wheel carried by said shaft and carrying a plurality of arms each of which during the rotation of the wheel is adapted to extend across and move rearwardly in said throat, gear means for coupling said wheel with driving mechanism for said endless chains whereby the arms will move along said throat at a slower speed than the adjacent upper chains, and elongated resilient arms arranged in spaced parallel relation in said throat adjacent the upper chains and acting to remove corn stalks from engagement with the chains in the portion of the throat traversed by said arms.

7. In an apparatus for moving cut standing corn to a binder and including spaced parallel upper and lower platforms forming a throatway and upper and lower conveyor chains overlying said platforms on either side of the throatway, a pair of relatively long resilient arms disposed upon opposite sides of said throat at the forward end thereof and spaced from the adjacent upper platforms a distance sufficient to disengage corn stalks entering the throat from the adjacent upper chains, a pair of shafts carried by one of the upper platforms for rotation about a vertical axis, sprocket wheels carried by said shafts, a sprocket chain connecting said wheels, a plurality of arms carried by said chain, said arms being arranged to move longitudinally of and extend across said throat through a portion thereof flanked by said resilient arms, and means for driving said sprocket wheels and said sprocket chain at a slower speed than the adjacent upper conveyor chains.

8. An apparatus for conveying cut standing corn to a binder, including upper and lower conveyor chains, comprising means for removing the upper portion of the corn stalks from engagement with the upper chains, and means for continuing the movement of said upper portion of the stalk in the direction of movement of the chains at a slower speed than the chains.

9. In an apparatus for conveying cut standing corn to a binder, including upper and lower conveyor chains for carrying cut corn in an upright position to a binder, means operating during a period of movement of the stalks by the chains to retard the upper ends of the stalks to arrange the same for movement to the binder with the butt ends in advance of the tops.

10. In an apparatus for conveying cut standing corn to a binder, including upper and lower conveyor chains for carrying cut corn in an upright position to a binder, means operating during a period of movement of the stalks by the chains to retard the upper ends of the stalks to arrange the same for movement to the binder with the butt ends in advance of the tops, and means disposed between the chains for holding the stalks from falling before reaching the binder.

11. In an apparatus for conveying cut standing corn to a binder, including upper and lower conveyor chains for carrying cut corn in an upright position to a binder, means operating during a period of movement of the stalks by the chains to retard the upper ends of the stalks to arrange the same for movement to the binder with the butt ends in advance of the tops, and an arm member disposed across the path travelled by the stalks between the chains for maintaining the stalks from falling before being picked up by the binder mechanism.

12. In an apparatus for moving cut standing corn to a binder and including spaced upper and lower platforms forming a throat-way, and upper and lower conveyor chains overlying said platforms, on either side of the throat-way, means at opposite sides of said throat-way adjacent the upper conveyor chains, for releasing the upper portions of corn stalks passing through the throat from engagement by the upper chains for a period in the travel of the stalks through the throat, a pair of shafts carried by one of the upper platforms for rotation about a substantially vertical axis, sprocket wheels carried by said shafts, a sprocket chain connecting said wheels, a plurality of arms carried by said chain, said arms being arranged to move longitudinally of and extending across said throat in the portion thereof in which said means operates, and means for driving said sprocket wheels and said sprocket chain at a slower speed than the adjacent conveyor chains.

13. In an apparatus for moving cut standing corn to a binder, including spaced parallel upper and lower platforms forming a throat-way and upper and lower conveyor chains overlying said platforms on either side of the throat-way, a wheel mounted upon one of said upper platforms for rotation about a vertical axis, arm members carried by said wheel for extension across said throat and movement for a short distance longitudinally thereof, means for rotating said wheel at a speed to move the arms at a slower speed than the adjacent chains, and means in said throat for effecting the removal of the upper portions of corn stalks passing therethrough from engagement by the upper chains.

In testimony whereof I hereunto affix my signature.

HERMAN A. STRUEBING.